United States Patent
Kang et al.

(10) Patent No.: US 11,350,045 B2
(45) Date of Patent: May 31, 2022

(54) IMAGE SENSING APPARATUS AND IMAGE BINNING METHOD THEREOF

(71) Applicant: SAMSUNG ELECTRONICS CO., LTD., Suwon-si (KR)

(72) Inventors: Hee Kang, Hwaseong-si (KR); Chan Young Jang, Pohang-si (KR); Woo Seok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/130,997

(22) Filed: Dec. 22, 2020

(65) Prior Publication Data

US 2021/0289150 A1    Sep. 16, 2021

(30) Foreign Application Priority Data

Mar. 10, 2020 (KR) .................. 10-2020-0029370

(51) Int. Cl.
*H04N 5/225* (2006.01)
*H04N 5/347* (2011.01)
*H04N 5/369* (2011.01)
*H04N 9/04* (2006.01)

(52) U.S. Cl.
CPC ......... *H04N 5/347* (2013.01); *H04N 5/36965* (2018.08); *H04N 9/04511* (2018.08); *H04N 9/04557* (2018.08)

(58) Field of Classification Search
CPC .................................................... H04N 5/347
See application file for complete search history.

(56) References Cited

U.S. PATENT DOCUMENTS

| | | | |
|---|---|---|---|
| 7,929,807 B2 | 4/2011 | Andersen | |
| 8,780,238 B2 | 7/2014 | Bowers | |
| 8,786,731 B2 | 7/2014 | Kasai | |
| 9,137,452 B2 | 9/2015 | Han | |
| 9,214,486 B2 | 12/2015 | Miyahara | |
| 9,584,742 B2 | 2/2017 | Park et al. | |
| 9,686,485 B2 | 6/2017 | Agranov et al. | |
| 2002/0191828 A1* | 12/2002 | Colbeth | H04N 5/367 382/132 |
| 2005/0103977 A1* | 5/2005 | Krymski | H04N 3/1562 250/208.1 |
| 2008/0084341 A1* | 4/2008 | Boemler | H04N 5/347 341/143 |
| 2008/0088725 A1 | 4/2008 | Matsunaga | |

(Continued)

FOREIGN PATENT DOCUMENTS

WO    2011/023229 A1    3/2011

*Primary Examiner* — James M Hannett
*Assistant Examiner* — Dwight Alex C Tejano
(74) *Attorney, Agent, or Firm* — Sughrue Mion, PLLC

(57) ABSTRACT

Provided is an image sensing apparatus including an image sensor including a pixel array configured to output a raw image having a Bayer pattern, and an analog end configured to perform an analog binning process on groups of pixels of same colors included in same columns of each of a plurality of sub-kernels corresponding to a first green pixel, a red pixel, a blue pixel, and a second green pixel, and output median values for different colors, and a digital signal processor configured to perform a digital binning process on the median values for the different colors included in different columns of each of the plurality of sub-kernels, and output a binned image.

14 Claims, 15 Drawing Sheets

(56) References Cited

U.S. PATENT DOCUMENTS

| | | | |
|---|---|---|---|
| 2008/0260291 A1 | 10/2008 | Alakarhu et al. | |
| 2008/0309810 A1* | 12/2008 | Smith | H04N 5/3532 348/319 |
| 2010/0231765 A1* | 9/2010 | Kefeder | H04N 9/04515 348/273 |
| 2011/0096189 A1* | 4/2011 | Taniguchi | H04N 5/378 348/222.1 |
| 2011/0102646 A1* | 5/2011 | Minagawa | H04N 5/347 348/242 |
| 2012/0140089 A1* | 6/2012 | Koh | H04N 5/772 348/220.1 |
| 2012/0194720 A1* | 8/2012 | Bowers | H04N 9/04511 348/302 |
| 2013/0001402 A1* | 1/2013 | Ogushi | H04N 5/347 250/208.1 |
| 2015/0189198 A1* | 7/2015 | Park | H04N 5/347 348/302 |
| 2016/0316158 A1* | 10/2016 | Uchida | H04N 5/23245 |

\* cited by examiner

IMAGE SENSING APPARATUS AND IMAGE BINNING METHOD THEREOF

CROSS-REFERENCE TO RELATED APPLICATIONS

This application claims priority to Korean Patent Application No. 10-2020-0029370, filed on Mar. 10, 2020, and Korean Patent Application No. 10-2020-0097290 filed on Aug. 4, 2020, the disclosures of which are incorporated herein by reference in their entireties.

BACKGROUND

1. Field

Example embodiments of the present disclosure relate to an image sensing apparatus and an image binning method thereof.

2. Description of Related Art

An image sensing apparatus can be used in a mobile device or an electronic device such as a smartphone, a tablet personal computer (PC), a digital camera, or the like. Typically, the image sensing apparatus is configured to have pixels two-dimensionally integrated and converts electrical signals corresponding to the brightness of incident light into digital signals and outputs the digital signals. Here, the image sensing apparatus may include a Bayer pattern and may provide Bayer image data corresponding to the brightness of light incident upon the Bayer pattern.

The number of pixels in each image sensing apparatus, i.e., the resolution of image sensing apparatuses, has increased in accordance with developments in technology, and an increase in the pixel resolution may result in an increase in the amount of data to be processed. Thus, image sensing apparatuses perform binning. Binning not only includes creating an image using information of all pixels of an image sensing apparatus, but also includes incorporating information on each group of adjacent pixels into a single piece of integrated information and creating a target image that needs to be processed, with the use of the integrated information.

SUMMARY

One or more example embodiments provide an image binning method, which is capable of reducing or alleviating zagging noise and any false color defects and thereby outputting a binned image with an improved quality.

One or more example embodiments also provide an image sensing apparatus, which is capable of reducing or alleviating zagging noise and any false color defects and thereby outputting a binned image with an improved quality.

However, embodiments are not restricted to those set forth herein. The above and other example embodiments will become more apparent to one of ordinary skill in the art to which the present disclosure pertains by referencing the detailed description of the present disclosure given below.

According to an aspect of an example embodiment, there is provided an image sensing apparatus including an image sensor including a pixel array configured to output a raw image having a Bayer pattern, and an analog end configured to perform an analog binning process on groups of pixels of same colors included in same columns of each of a plurality of sub-kernels corresponding to a first green pixel, a red pixel, a blue pixel, and a second green pixel, and output median values for different colors, and a digital signal processor configured to perform a digital binning process on the median values for the different colors included in different columns of each of the plurality of sub-kernels, and output a binned image.

According to another aspect of an example embodiment, there is provided an image binning method of an image sensing apparatus, the method including receiving a raw image of a Bayer pattern from a pixel array, outputting median values for each kernel based on performing an analog binning process on the raw image of a unit kernel having an asymmetrical arrangement with respect to different colors, and outputting a binned image based on performing a digital binning process on at least one of the median values.

According to yet another aspect of an example embodiment, there is provided an image sensing apparatus including an image sensor including a pixel array and an analog end, and a digital signal processor, wherein the pixel array is configured to output a raw image of a Bayer pattern, wherein the analog end is configured to perform an analog binning process on a first pixel and a second pixel provided in a diagonal direction for each color from each of square unit kernels of the raw image and output a median value for a corresponding color, and wherein the digital signal processor is configured to obtain and output a binned pixel value based on performing a digital binning process on the median value and a third pixel that is provided at a corner of the corresponding color from each of the unit kernels and generate a binned image including the binned pixel value.

BRIEF DESCRIPTION OF THE DRAWINGS

The above and/or other aspects will become more apparent by describing in detail example embodiments with reference to the attached drawings, in which.

DETAILED DESCRIPTION

Example embodiments will hereinafter be described with reference to the accompanying drawings.

Units and modules disclosed herein and functional blocks illustrated in the accompanying drawings may each be implemented as hardware, software, or a combination thereof that is configured to perform particular functions.

Figure 1:
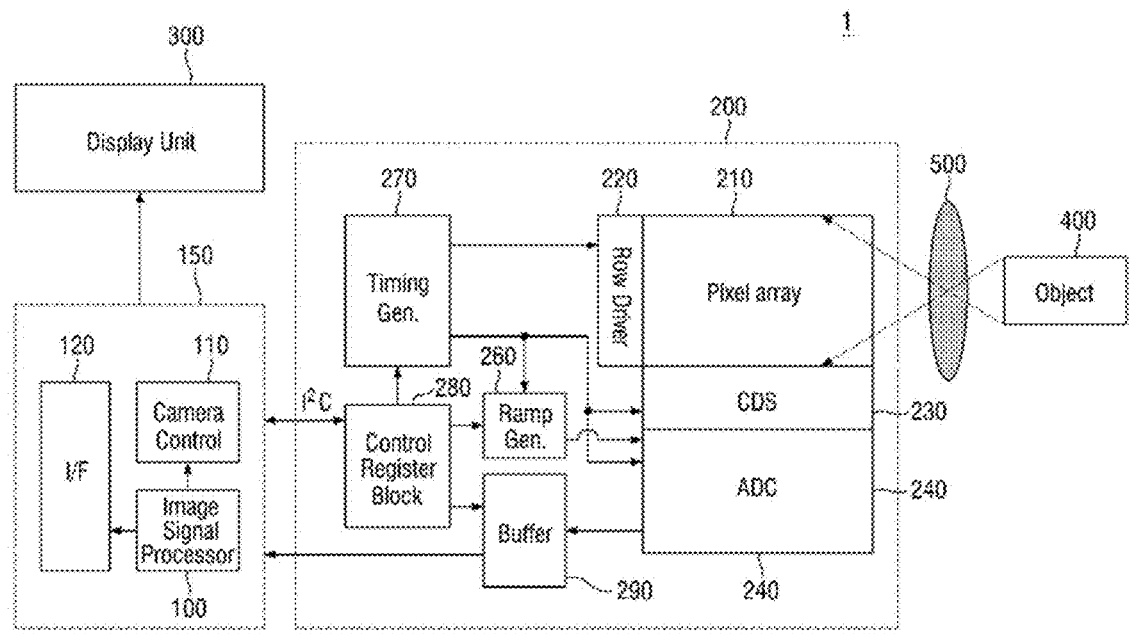
FIG. 1 is a block diagram of an image sensing apparatus according to example embodiments.

FIG. 1 is a block diagram of an image sensing apparatus according to example embodiments.

Referring to FIG. 1, an image sensing apparatus 1 may include a display unit 300, a digital signal processor (DSP) 150, and an image sensor 200.

The image sensor 200 includes a pixel array 210, a row driver 220, a correlated double sampling (CDS) block 230, an analog-to-digital converter (ADC) 240, a ramp generator 260, a timing generator 270, a control register block 280, and a buffer 290.

The image sensor 200 may sense an object 400, which is captured via a lens 500, under the control of the DSP 150, and the DSP 150 may output an image sensed and output by the image sensor 200 to the display unit 300.

In example embodiments, the image sensor 200 may receive a raw image from the pixel array 210, may perform analog binning on the raw image via the ADC 240 and the buffer 290, and may output the resulting analog-binned image to the DSP 150.

Examples of the display unit 300 may include various types of devices that may output or display an image. For example, the display unit 300 may be a computer, a mobile communication device, or another image output terminal.

The DSP 150 includes a camera controller 110, an image signal processor (ISP) 100, and an interface (I/F) 120.

The camera controller 110 may control the operation of the control register block 280. The camera controller 110 may control the operation of the image sensor 200, particularly, the operation of the control register block 280, with the use of an inter-integrated circuit (I2C), but embodiments are not limited thereto.

The ISP 100 may receive image data from the buffer 290, may process the received image data to look favorable to a user, and may output the processed image data to the display unit 300 via the I/F 120.

The ISP 100 may perform digital binning on an image output by the image sensor 200. The ISP 100 may output the resulting digital-binned image to the display unit 300 as a final binned image. The image output by the image sensor 200 may be a raw image from the pixel array 210 or may be an analog-binned image.

Referring to FIG. 1, the ISP 100 is illustrated as being located in the DSP 150. However, embodiments are not limited thereto. For example, according to other example embodiments, the ISP 100 may be included in the image sensor 200. Also, in other example embodiments, the image sensor 200 and the ISP 100 may be implemented as a single package such as, for example, a multi-chip package (MCP).

The pixel array 210 may be implemented as an array of multiple photo detection devices such as, for example photodiodes or pinned photodiodes. Raw image data output from the pixel array 210 via the CDS block 230 and the ADC 240 may be Bayer image data configured in a Bayer format.

Bayer image data may be processed into red-green-blue (RGB) format data by the ISP 100 and may then be output to the display unit 300.

The term "pixel" or "pixel value", as used herein, may refer to information or a value output or acquired from an optical signal via each pixel element that forms a Bayer color filter. The term "raw image", as used herein, may refer to an image based on unit raw pixels to be subjected to image signal processing, particularly, pixel values sensed by an image sensor. The term "binned image", as used herein, may refer to a post-processed image obtained by processing a raw image with the use of a predetermined method.

Figure 2:
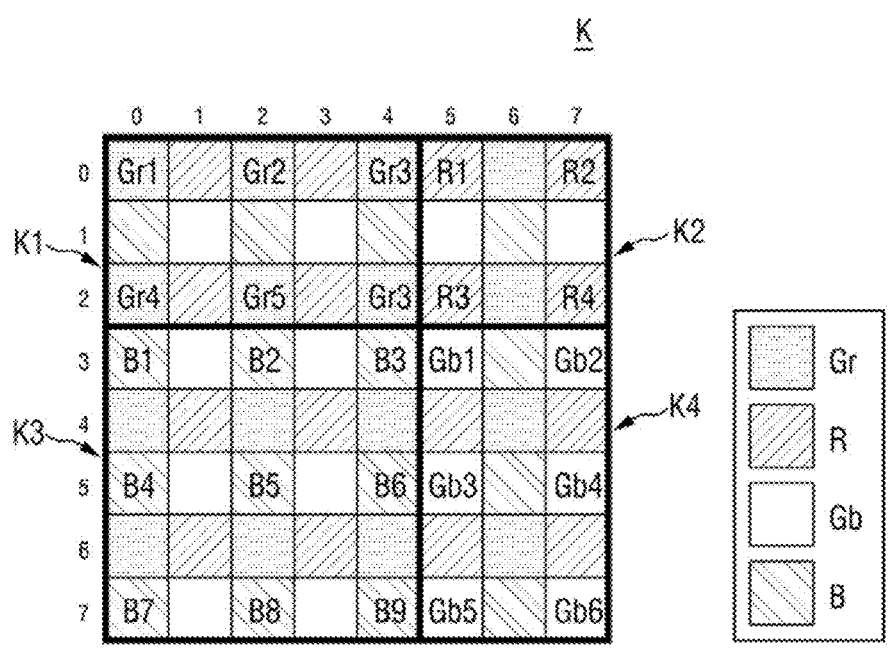
FIGS. 2 and 3 illustrate a raw Bayer image and a binned Bayer image, respectively, for explaining an image binning method according to example embodiments.

In the description that follows, it is assumed that a raw image has a Bayer pattern in which a row having Gr and R pixels alternately arranged therein and a row having Gr and B pixels alternately arranged therein are alternately arranged, as illustrated in FIG. 2. Here, the R pixel refers to a red pixel, the B pixel refers to a blue pixel, and the Gr and Gb pixels both refer to green pixels. Specifically, green pixels included in rows with red pixels are referred to by Gr, and green pixels included in rows with blue pixels are referred to by Gb.

A binned image is a down-scaled image, and each pixel of a binned image may be referred to by R', G' (e.g., Gr' or Gb'), or B'. A binned image may also have a Bayer pattern in which a row having Gr' and R' pixels alternately arranged therein and a row having Gr' and B' pixels alternately arranged therein are alternately arranged.

Figure 3:
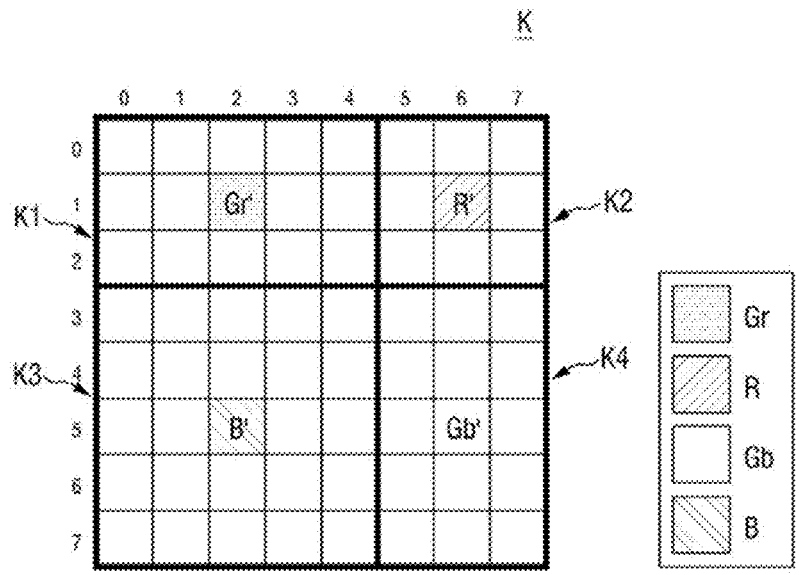

FIGS. 2 and 3 illustrate a raw Bayer image and a binned Bayer image, respectively, for explaining an image binning method according to example embodiments.

The image binning method of FIGS. 2 and 3 may be performed in units of (4n+4)×(4n+4) kernels. FIGS. 2 and 3 illustrate an example in which n=1, i.e., kernel size is 8×8.

Referring to FIG. 2, a raw image may have a Bayer pattern in which a row having Gr and R pixels alternately arranged therein and a row having B and Gb pixels alternately arranged are alternately arranged.

Image binning may be performed in units of kernels K each including sub-kernels. The image binning method of FIGS. 2 and 3 will hereinafter be described as being performed on a raw image having a kernel size of 8×8, but embodiments are not limited thereto. That is, the image binning method of FIGS. 2 and 3 may also be applicable to raw images having various other kernel sizes.

A kernel K may include a plurality of sub-kernels K1 through K4 for different colors, and the sub-kernels K1 through K4 may be arranged asymmetrically with one another. Specifically, a Gr sub-kernel K1 and an R sub-kernel K2 that belong to the same row may be asymmetrical with each other, and a B sub-kernel K3 and a Gb sub-kernel K2 that belong to the same row may be asymmetrical with each other. Also, the Gr sub-kernel K1 and the B sub-kernel K3 that belong to the same column may be asymmetrical with each other, and the R sub-kernel K2 and the Gb sub-kernel K4 that belong to the same column may be asymmetrical with each other.

The image sensing apparatus 1 may generate a binned image by binning the raw image for different colors for different sub-kernels. That is, Gr pixels are binned from the sub-kernel K1, R pixels may be binned from the sub-kernel K2, B pixels may be binned from the sub-kernel K3, and Gb pixels may be binned from the sub-kernel K4.

Specifically, referring to FIGS. 2 and 3, six Gr pixels, four R pixels, nine B pixels, and six Gb pixels may be binned from the raw image, thereby generating a binned image with Gr', R', B', and Gb' pixels. The Gr', R', B', and Gb' pixels may be as shown in Equation (1) below.

$$Gr'=(Gr1+Gr2+Gr3+Gr4+Gr5+Gr6)/6$$

$$R'=(R1+R2+R3+R4)/4$$

$$B'=(B1+B2+B3+B4+B5+B6+B7+B8+B9)/9$$

$$Gb'=(Gb1+Gb2+Gb3+Gb4+Gb5+Gb6)/6 \quad \text{<Equation 1>}$$

Each pixel of the binned image may be generated at a location corresponding to the center of gravity of each sub-kernel. For example, when the coordinates of the upper left corner of the kernel K is (0, 0), the Gr' pixel is generated at (2, 1), which is the center of the sub-kernel K1, the R' pixel is generated at (6, 1), which is the center of the sub-kernel K2, the B' is generated at (2, 5), which is the center of the sub-kernel K3, and the Gb' pixel is generated at (6, 5), which is the center of the sub-kernel K4.

Referring to FIG. 3, in the binned image, the distances between the Gr', R', B', and Gb' pixels, for example, the distance between the Gr' and R' pixels, the distance between the B' and Gb' pixels, the distance between the Gr' and B' pixels, and the distance between the R' and Gb' pixels may all be the same.

The distances between the pixels of the binned image can be maintained in a uniform ratio to the distances between the pixels of the raw image by making the number of input pixels for use in a binning operation differ from one sub-kernel to another sub-kernel for different color channels. As a result, the binned image can become robust against any false color defects and aliasing.

The image binning method of FIGS. 2 and 3 may be performed by the ISP 100.

As illustrated in FIGS. 3 through 6, each of the Gr', R', B', and Gb' pixels of the binned image may be obtained by performing analog binning on raw pixels that belong to the same column to obtain median values and adding up and averaging median values from different columns via digital binning. Analog binning may be performed by an output end including the CDS 230, the ADC 240, and the buffer 290 of the pixel array 210.

The output end (230, 240, and 290) of the pixel array 210, by which analog binning is performed, will hereinafter be referred to as an analog end. Digital binning may be performed by the ISP 100 and may include adding up and averaging median values stored in the buffer 290, and thereby outputting a binned pixel value to the I/F 120.

Figure 4A:
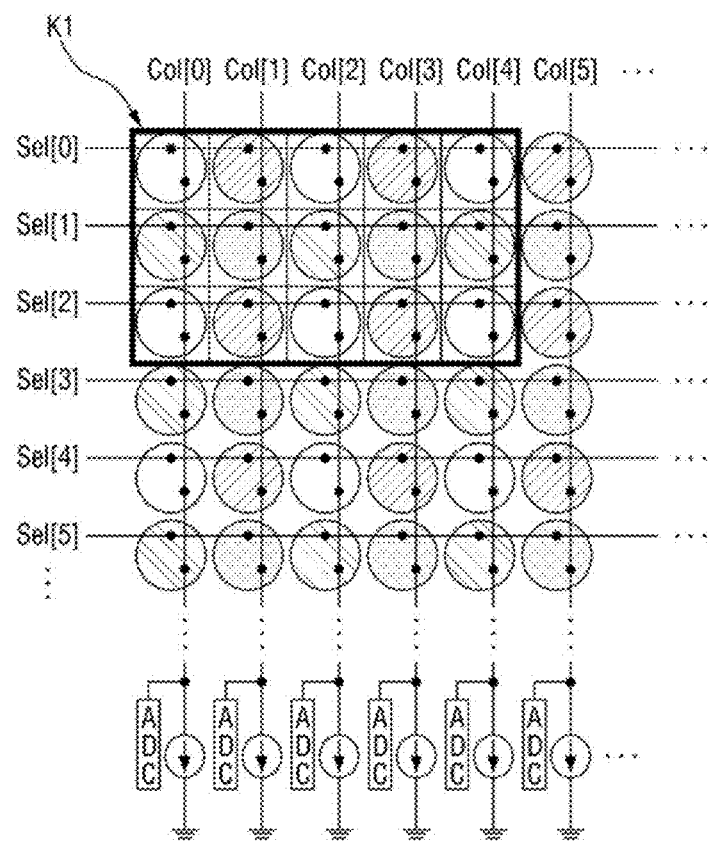
FIGS. 4A and 4B illustrate pixel arrays according to example embodiments as Bayer patterns.
Figure 4B:
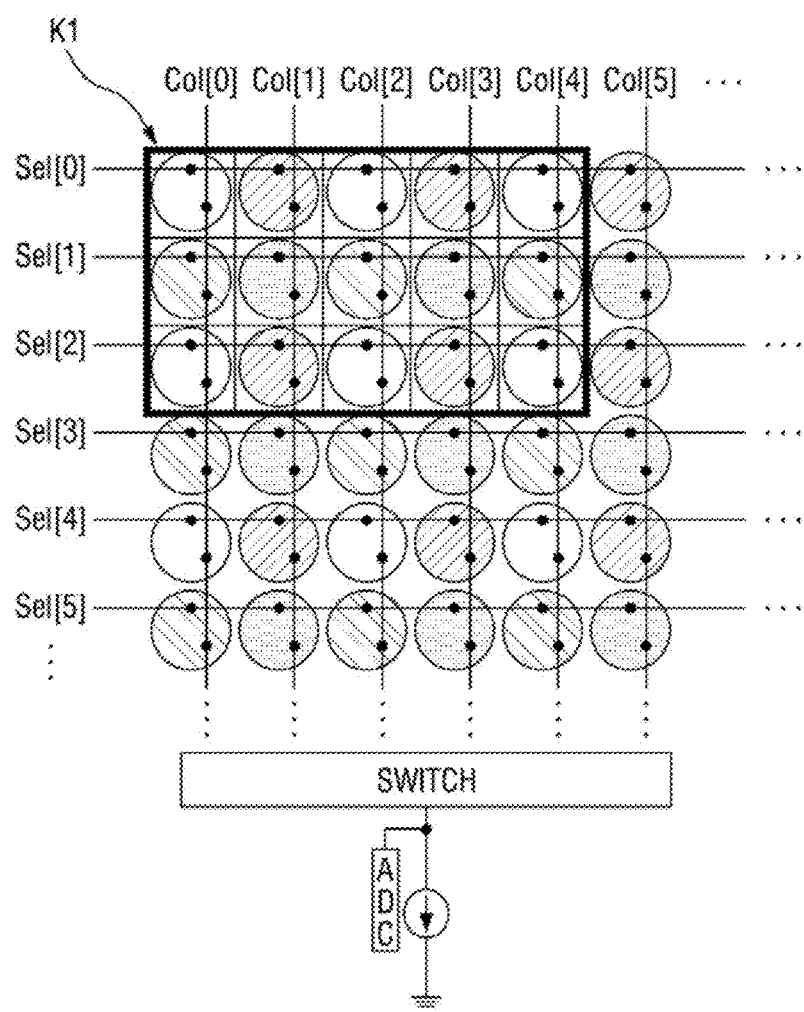
Figure 5:
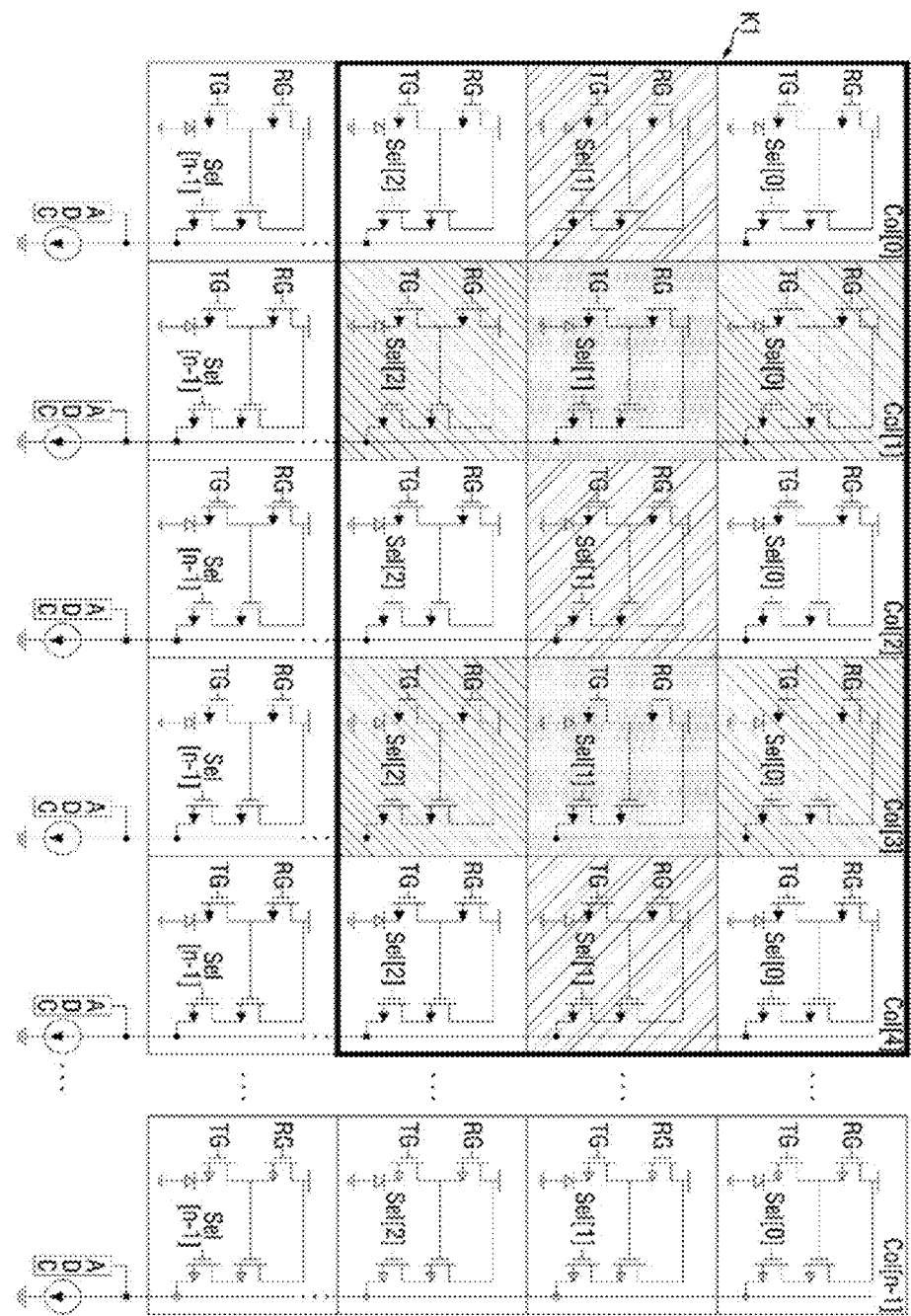
FIG. 5 is a circuit diagram of the pixel array of FIG. 4A.
Figure 6:
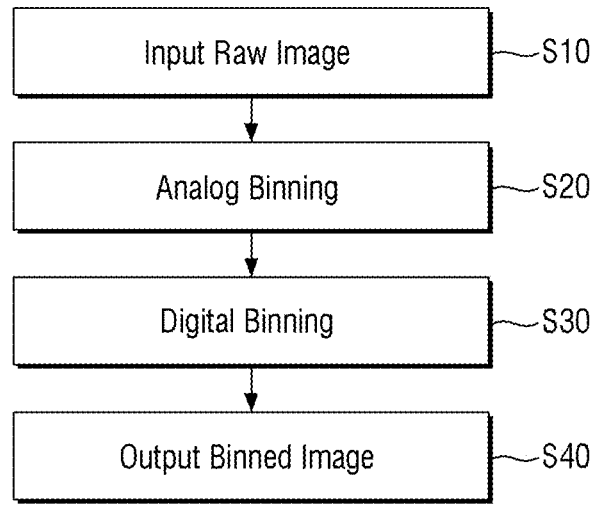
FIG. 6 is a flowchart illustrating an image binning method according to example embodiments.

FIGS. 4A and 4B illustrate pixel arrays according to example embodiments as Bayer patterns. FIG. 5 is a circuit diagram of the pixel array of FIG. 4A. FIG. 6 is a flowchart illustrating an image binning method according to some embodiments of the present disclosure.

The sub-kernel K1 of FIG. 2 may be implemented as illustrated in FIG. 4A or 4B. Referring to FIGS. 4A and 4B, an ADC 240 and a current source may be connected to each column of a pixel array.

The sub-kernel K1 may correspond to part of a pixel array. FIGS. 4A and 4B illustrate that the sub-kernel K1 includes five columns of pixels and three rows of pixels, i.e., a total of 15 pixels, but embodiments are not limited thereto. For example, the sub-kernel K1 may be implemented in various other manners.

Each of the pixel arrays of FIGS. 4A and 4B includes a plurality of unit kernels, and each of the unit kernels may include four pixels, for example, Gr, R, B, and Gb pixels. FIG. 5 illustrates an example in which each pixel includes a photodiode, a transfer transistor, a reset transistor, a selection transistor, and a drive transistor. A row-direction selection signal Sel is applied to the gate of the selection transistor, and a column-direction direction Col is applied to the drain of the selection transistor. In example embodiments, as illustrated in FIG. 4A, different columns of a pixel array may be connected to different ADCs and different current sources. According to another example embodiment, as illustrated in FIG. 4B, all columns of a pixel array may be connected to the same common ADC and the same common current source via a switch. For example, the common ADC and the common current source may be connected to the pixel array such that they may be switched in accordance with a Bayer pattern arrangement and may thus be shared in common by pixels of the same color. According to another example embodiment, the common ADC and the common current source may be connected to the pixel array such that they may be switched for image binning and may thus be shared in common on a unit kernel-by-unit kernel basis.

Each pixel may include four transistors and at least one photodiode, as illustrated in FIG. 5. However, embodiments are not limited thereto. For example, each pixel may include three transistors and at least one photodiode, or each pixel may include five transistors and at least one photodiode. FIG. 5 illustrates that each pixel of a pixel array includes four transistors and one photodiode, and that different columns of the pixel array are connected to different ADCs and different current sources, but embodiments are not limited thereto. For example, each pixel of the pixel array of FIG. 5 may include four transistors and one photodiode, and at least two columns of the pixel array of FIG. 5 may be connected to the same common ADC and the same common current source.

The image sensing apparatus 1 may perform image binning in units of kernels. In example embodiments, referring to FIGS. 4A and 6, in response to a raw image being input (S10), image binning is performed in units of sub-kernels. Then, median values are calculated (S20) by performing analog binning on groups of pixels that belong to the same columns of each sub-kernel, and median values from different columns of a corresponding sub-kernel may be added up via digital binning (S30). The result of the addition may be output as a pixel value of a binned image (S40).

Referring to FIGS. 4B and 6, in response to a raw image being input (S10), image binning is performed in units of sub-kernels. Then, median values are calculated (S20) by performing analog binning on groups of pixels of the same color that belong to the same row, but belong to different columns, via an ADC and a current source that are connected in common to at least two columns that the pixels of the same colors belong to. Thereafter, pixel values for the same color that belong to one of the at least two columns together, but to different rows, and the median values may be added up via digital binning (S30), and the result of the addition is output as a pixel value of a binned image (S40).

The image sensing apparatus 1 may generate a Gr' pixel of a binned image using six Gr pixels of the sub-kernel K1. The image sensing apparatus 1 may select one color pixel from the same location of each unit kernel. For example, each unit kernel may be a 2×2 pixel array, a pixel at (0,0), for example, a Gr pixel, is selected from a unit kernel including (0, 0), (1, 0), (0, 1), and (1, 1), and a Gr pixel at (2, 0) is selected from a unit kernel including (2, 0), (2, 1), (3, 0), and (3, 1).

The image sensing apparatus 1 may select one pixel from each unit kernel and may activate Gr1, Gr2, Gr3, Gr4, Gr5, and Gr6 pixels at (0, 0), (0, 2), (2, 0), (2, 2), (4, 0), and (4, 2), respectively, by turning on Sel[0] and Sel[2] and turning on Col[0], Col[2], and Col[4].

To find the value of a Gr' pixel in accordance with Equation (1), the image sensing apparatus 1 may output three median Gr values, for example, Gr1+Gr4, Gr2+Gr5, and Gr3+Gr6, which are obtained by adding up the values of the pixels at (0, 0) and (0, 2), the values of the pixels at (2, 0) and (2, 2), and the values of the pixels at (4, 0) and (4, 2), respectively, at an analog end including an ADC and a current source. The image sensing apparatus 1 may then add up the three median Gr values and divide the result of the addition by the number of input pixels (i.e., 6), at a digital end, and may output the result of the division as the value of the Gr' pixel.

The image sensing apparatus 1 may find the values of R', B', and Gb' pixels from the sub-kernels K2, K3, and K4 in the same manner used to find the value of the Gr' pixel. For example, the image sensing apparatus 1 may output two median R values, for example, R1+R3 and R2+R4, which are obtained by adding up the values of the pixels at (5,0) and (5,2) and the values of the pixels at (7, 0) and (7, 2), respectively, at an analog end including an ADC and a current source. The image sensing apparatus 1 may then add up the two median R values and divide the result of the addition by the number of input pixels (i.e., 4) at a digital end, and may output the result of the division as the value of the R' pixel.

To find the value of a B' pixel in accordance with Equation (1), the image sensing apparatus 1 may output three median B values, for example, B1+B4+B7, B2+B5+B8, and B3+B6+B9, which are obtained by adding up the values of the pixels at (0, 3), (0, 5), and (0, 7), the values of the pixels at (2, 3), (2, 5), and (2, 7), and the values of the pixels at (4, 3), (4, 5), and (4, 7), respectively, at an analog end. The image sensing apparatus 1 may then add up the three median B values and divide the result of the addition by the number of input pixels (i.e., 9), at a digital end, and may output the result of the division as the value of the B' pixel.

To find the value of a Gb' pixel in accordance with Equation (1), the image sensing apparatus 1 may output two median Gb values, i.e., Gb1+Gb3+Gb5 and Gb2+Gb4+Gb6, which are obtained by adding up the values of the pixels at (5, 3), (5, 5), and (5, 7) and the values of the pixels at (7, 3), (7, 5), and (7, 7), respectively, at an analog end including an ADC and a current source. The image sensing apparatus 1 may then add up the two median Gb values and divide the result of the addition by the number of input pixels (i.e., 6), at a digital end, and may output the result of the division as the value of the Gb' pixel.

Figure 7:
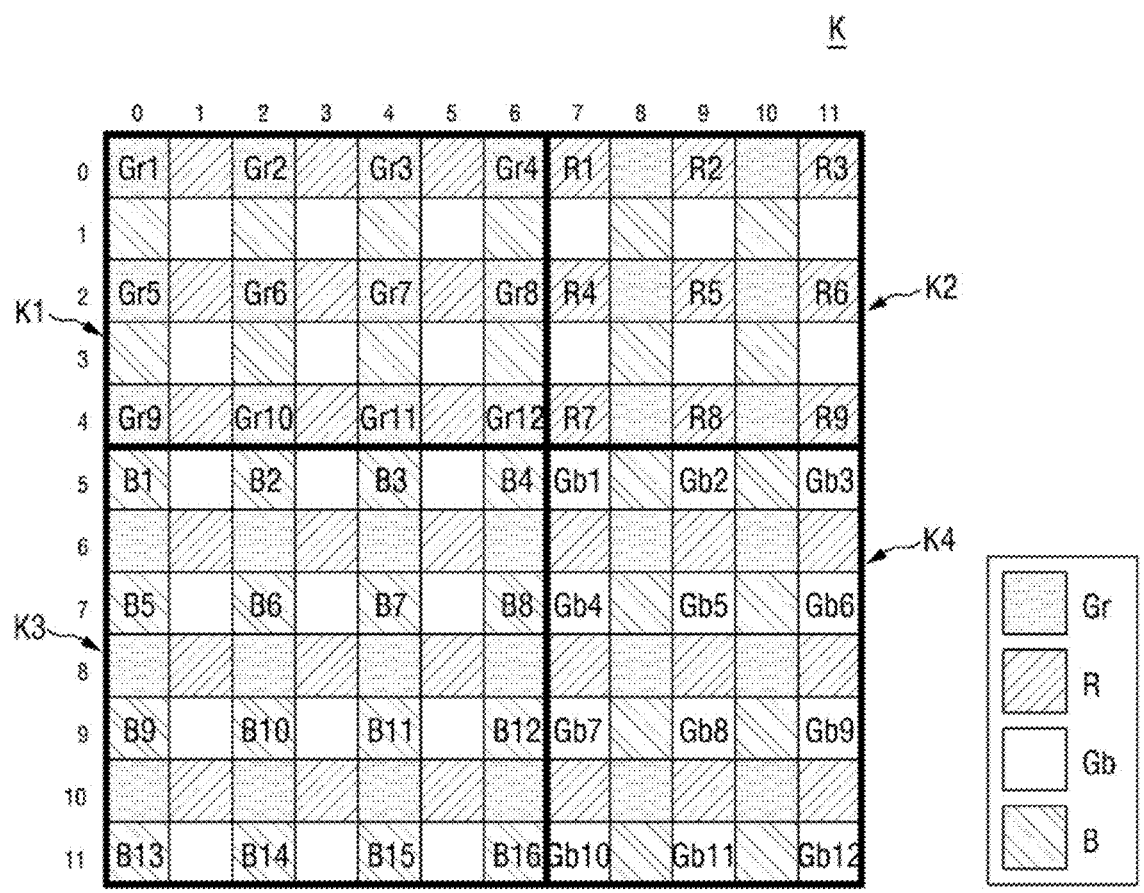
FIGS. 7 and 8 illustrate a raw Bayer image and a binned Bayer image, respectively, for explaining an image binning method according to example embodiments.
Figure 8:
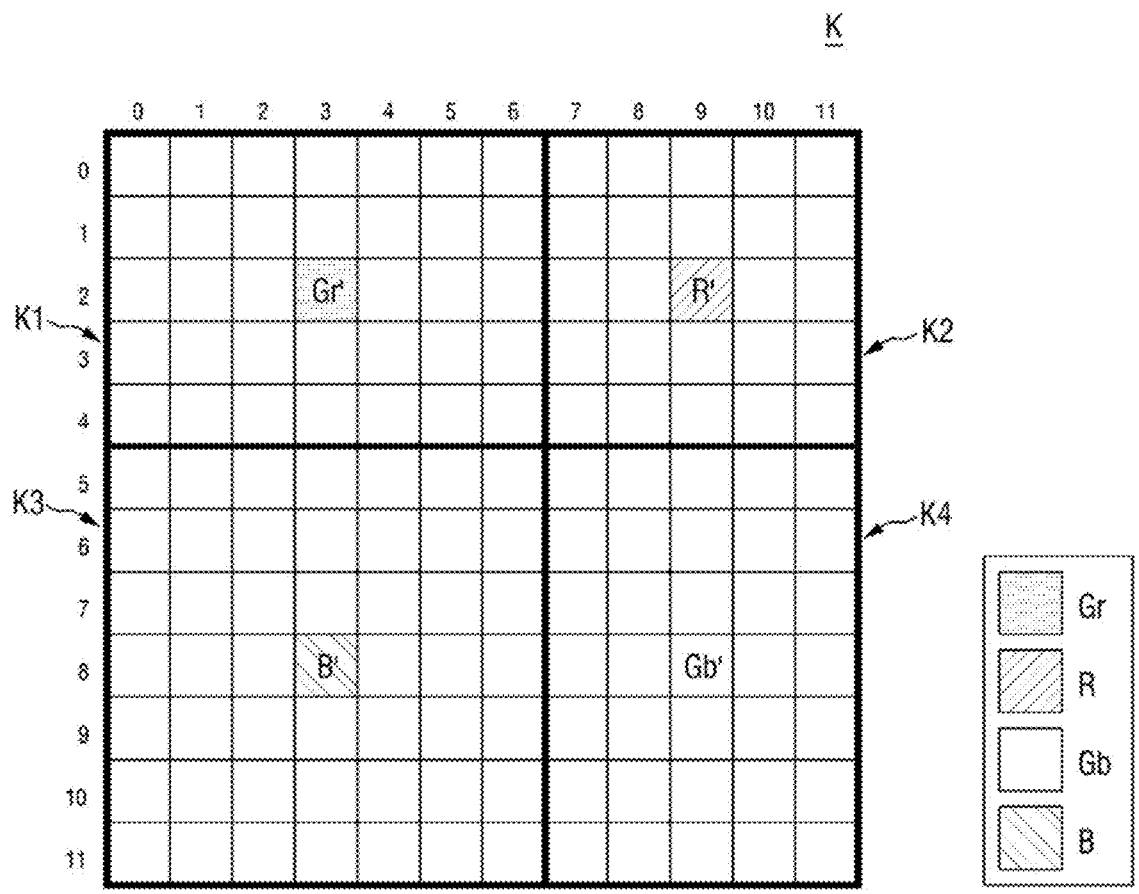

FIGS. 7 and 8 illustrate a raw Bayer image and a binned Bayer image, respectively, for explaining an image binning method according to example embodiments.

The image binning method of FIGS. 7 and 8 may be performed in units of (4n+4)×(4n+4) kernels. FIGS. 7 and 8 illustrate an example in which n=2 and image binning is performed in units of 12×12 kernels.

Referring to FIGS. 7 and 8, in a case where a kernel K has a size of 12×12, the kernel K may be divided into a 7×5 sub-kernel K1, a 5×5 sub-kernel K2, a 7×7 sub-kernel K3, and a 5×7 sub-kernel K4.

That is, each pair of horizontally or vertically adjacent sub-kernels of the kernel K may satisfy Equation (2) below.

$$L=M+N \text{ (where } M \text{ and } N \text{ are the closest odd numbers)} \quad \text{<Equation 2>}$$

Referring to Equation (2), L, M, and N are natural numbers and denote the length L in a first direction of the kernel K, the length M in the first direction of a first sub-kernel of the kernel K, and the length N in the first direction of a second sub-kernel of the kernel K, respectively.

If the kernel K has a size of 12×12, L=12, and M and N may be 5 and 7 that add up to 12. Thus, the kernel K may be divided into sub-kernels having a length of five or seven pixels. In the example of FIGS. 7 and 8, the kernel K may be divided into sub-kernels having a length, in a horizontal direction, of seven or five pixels and a length, in a vertical direction, of five and seven pixels. Alternatively, the kernel K may be divided into sub-kernels having a length, in a horizontal direction, of five or seven pixels and a length, in the vertical direction, of seven or five pixels. However, Gr and Gb pixels may be binned from sub-kernels having different lengths in the horizontal direction and in the vertical direction, such as, for example, the sub-kernels K1 and K4.

Referring to the binned image of FIG. 8, Gr', R', B', and Gb' pixels may be located in the sub-kernels K1, K2, K3, and K4, respectively, particularly, at (3, 2), (9, 2), (3, 8), and (9, 8), respectively.

The Gr', R', B', and Gb' pixels of the binned image may be output by the ISP 100 of the image sensing apparatus 1. Each of the Gr', R', B', and Gb' pixels of the binned image may be obtained by performing analog binning on groups of raw pixels that belong to the same columns to obtain median values and adding up and averaging median values from different columns via digital binning. Analog binning may be performed at the output end of the pixel array 200, and resulting median values may be stored in the buffer 290. Digital binning may be performed by the ISP 100 and may include adding up and averaging the median values stored in the buffer 290 and outputting a resulting binned pixel value to the I/F 120.

As a result, the Gr', R', B', and Gb' pixels of the binned image may be located on the same axes in the horizontal or vertical direction, at the centers of gravity of the kernels K1, K2, K3, and K4, respectively. Thus, the Gr', R', B', and Gb' pixels of the binned image may not cause zagging artifacts and may be more robust against false color defects.

Figure 9A:
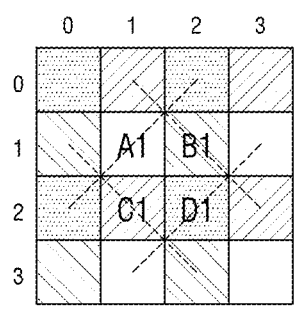
FIGS. 9A, 9B, and 9C illustrate an image binning method according to example embodiments.
Figure 9B:
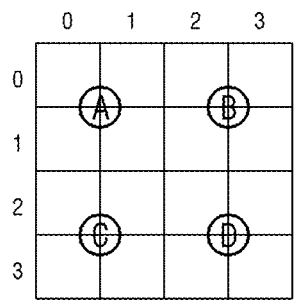
Figure 9C:
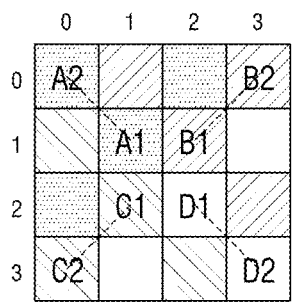
Figure 10:
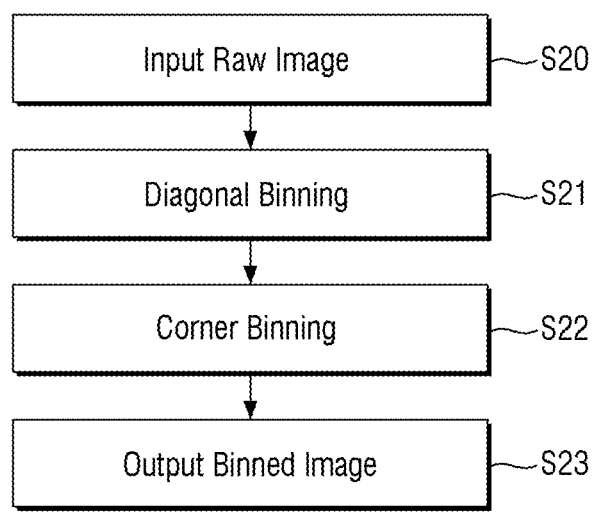
FIG. 10 is a flowchart illustrating the image binning method of FIG. 9.

FIGS. 9A, 9B, and 9C illustrate an image binning method according to some embodiments of the present disclosure. FIG. 10 is a flowchart illustrating the image binning method of FIG. 9.

FIGS. 9A, 9B, and 9C illustrate an example in which image binning is performed on a kernel having a size of 4×4, but embodiments are not limited thereto, and image binning may also be applicable to various other kernel sizes.

Referring to a raw 4×4 unit kernel image of FIG. 9A, a first binning process is performed on Gr pixels at (2, 0) and (0, 2), which are located in a first diagonal direction with respect to each other. As a result, a median Gr value obtained by the first binning process is arranged at a point A1, i.e., at (1, 1). Referring to an intermediate 4×4 unit kernel image of FIG. 9B, a second binning process is performed on the median Gr value at (1, 1) and a Gr pixel at (0, 0), which is located in a second diagonal direction with respect to the median Gr value at (1, 1). Here, the second diagonal direction, which is a direction that perpendicularly intersects the first diagonal direction, may be a direction from the point A1 to a point A2. Referring to a binned 4×4 unit kernel image of FIG. 9C, a Gr' pixel obtained by the second binning process is arranged at an intermediate point Ⓐ between the points A1 and A2.

Similarly, referring again to the raw 4×4 unit kernel image of FIG. 9A, the first binning process is performed on R pixels at (1, 0) and (3, 2), which are located in the second diagonal direction with respect to each other. As a result, a median R value obtained by the first binning process is arranged at a point B1, i.e., at (2, 1). Referring to the intermediate 4×4 unit kernel image of FIG. 9B, the second binning process is performed on the median R value at (2, 1) and an R pixel at (3, 0), which is located in the first diagonal direction with respect to the median R value at (2, 1). Here, the first diagonal direction, which is a direction that perpendicularly intersects the second diagonal direction, may be a direction from the point B1 to a point B2. Referring to the binned 4×4 unit kernel image of FIG. 9C, an R' pixel obtained by the second binning process is arranged at an intermediate point Ⓑ between the points B1 and B2.

Similarly, referring again to the raw 4×4 unit kernel image of FIG. 9A, the first binning process is performed on B pixels at (0, 1) and (2, 3), which are located in the first direction with respect to each other. As a result, a median B value obtained by the first binning process is arranged at a point C1, i.e., at (1, 2). Referring to the intermediate 4×4 unit kernel image of FIG. 9B, the second binning process is performed on the median B value at (1, 2) and a B pixel at (0, 3), which is located in the second direction with respect to the median B value at (1, 2). Here, the second diagonal direction, which is a direction that perpendicularly intersects the second diagonal direction, may be a direction from the point C1 to a point C2. Referring to the binned 4×4 unit kernel image of FIG. 9C, a B' pixel obtained by the second binning process is arranged at an intermediate point Ⓒ between the points C1 and C2.

Similarly, referring again to the raw 4×4 unit kernel image of FIG. 9A, the first binning process is performed on Gb pixels at (1, 3) and (3, 1), which are located in the second diagonal direction with respect to each other. As a result, a median Gb value obtained by the first binning process is arranged at a point D1, i.e., at (2, 2). Referring to the intermediate 4×4 unit kernel image of FIG. 9B, the second binning process is performed on the median Gb value at (2, 2) and a Gb pixel at (3, 3), which is located in the first diagonal direction with respect to the median Gb value at (2, 2). Here, the first diagonal direction, which is a direction that perpendicularly intersects the second diagonal direction, may be a direction from the point D1 to a point D2. Referring to the binned 4×4 unit kernel image of FIG. 9C, the center of gravity of a Gb' pixel obtained by the second binning process is arranged at an intermediate point between the points D1 and D2.

In a 2×2 binned image, four pixels whose centers of gravity overlap with one another, for example, Gr, R, B, and Gb pixels obtained by the second binning process may be located at (0, 0), (1, 0), (0, 1), and (1, 1), at (2, 0), (3, 0), (2, 1), and (3, 1), at (0, 2), (1, 2), (0, 3), and (1, 3), and at (2, 2), (3, 2), (2, 3), and (3, 3), respectively.

FIGS. 9A to 9C illustrate 2×2 binning. As a result of 2×2 binning, each unit kernel of a raw image may be transformed from 4×4 to 2×2 or from 8×8 to 4×4. That is, 2×2 binning may be binning a 2n×2n kernel into an n×n kernel, where n is an integer greater than 0.

Referring to FIG. 10, the image sensing apparatus 1 may receive a raw image (S20) and may perform a first binning process on the raw image in a first direction or in a first diagonal direction (S21), thereby obtaining a median value. Here, the first diagonal direction may be a direction between pixels of the same color from different rows.

The image sensing apparatus 1 may perform a second binning process on the median value obtained by the first binning process and a raw pixel at a corner corresponding to the median value obtained by the first binning process (S22). The second binning process may be performed in a second direction or in the second diagonal direction. The second diagonal direction, which is a direction between the median value obtained by the first binning process and the raw pixel at the corner corresponding to the median value obtained by the first binning process, may be a direction that intersects the first diagonal direction. In example embodiments, the first binning process may also be a diagonal binning process, and the second binning process may also be a corner binning process. The result of the second binning process may be output as a binned image (S23).

The first and second binning processes may both be performed by the ISP 100 of FIG. 1. However, embodiments are not limited thereto. For example, the first binning process may be performed by the image sensor 200, and the second binning process may be performed by the ISP 100, in which case, the first binning process may be performed by the ADC 240 or the buffer 290.

Figure 11:
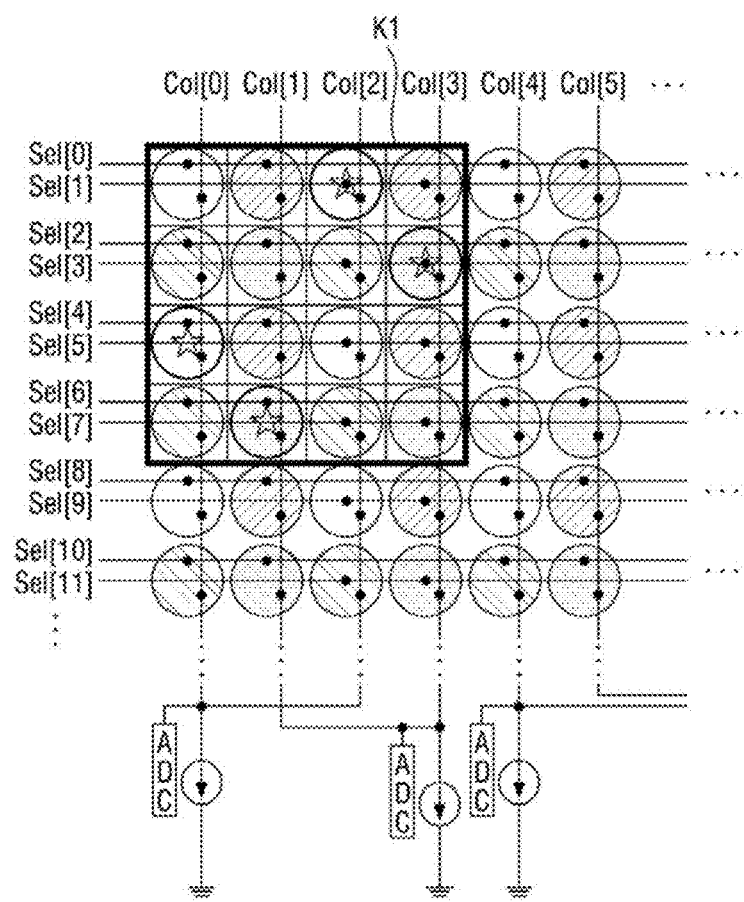
FIG. 11 illustrates an image sensor according to example embodiments.
Figure 12:
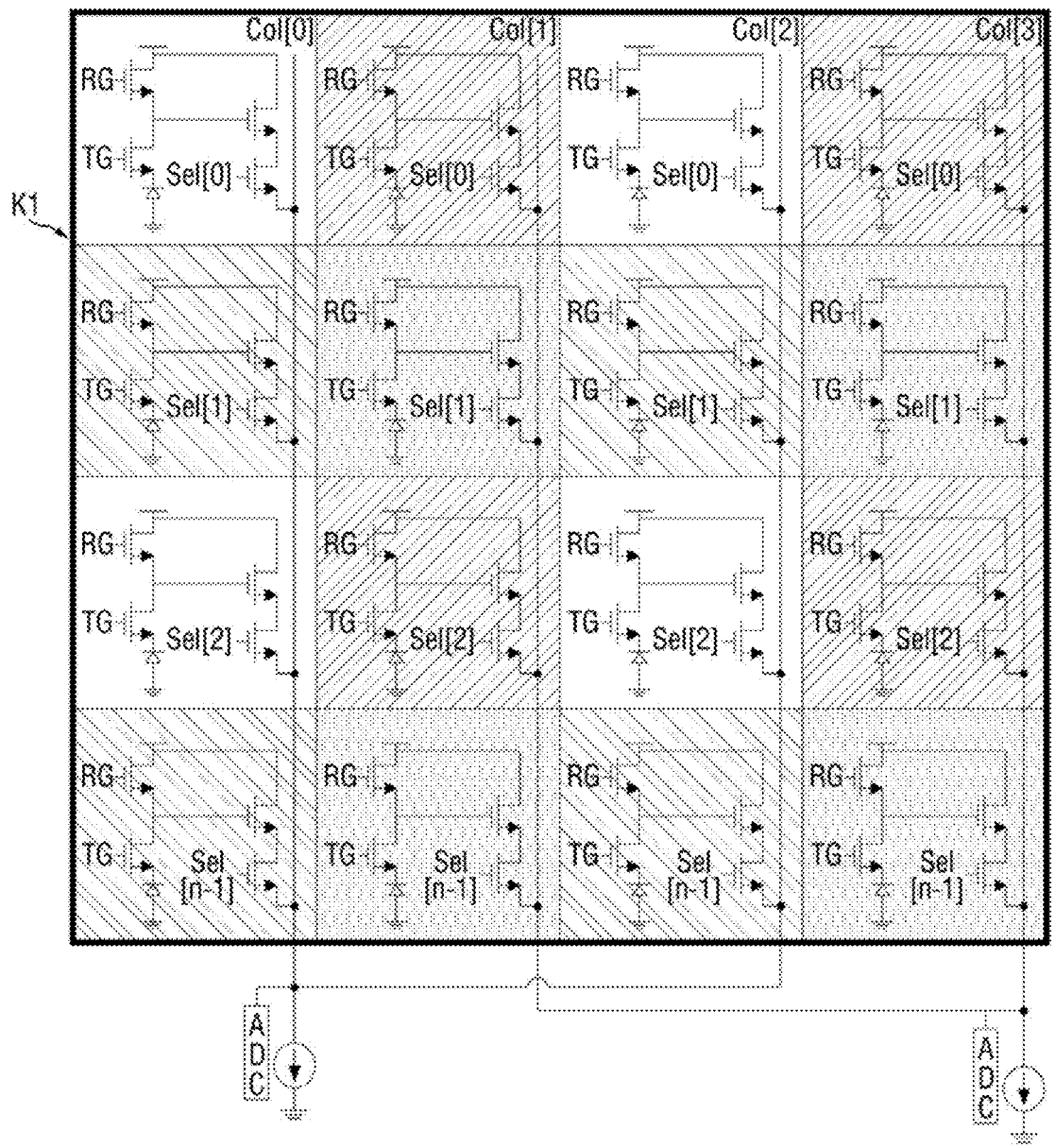
FIG. 12 is a circuit diagram of a pixel array of FIG. 11.
Figure 13:
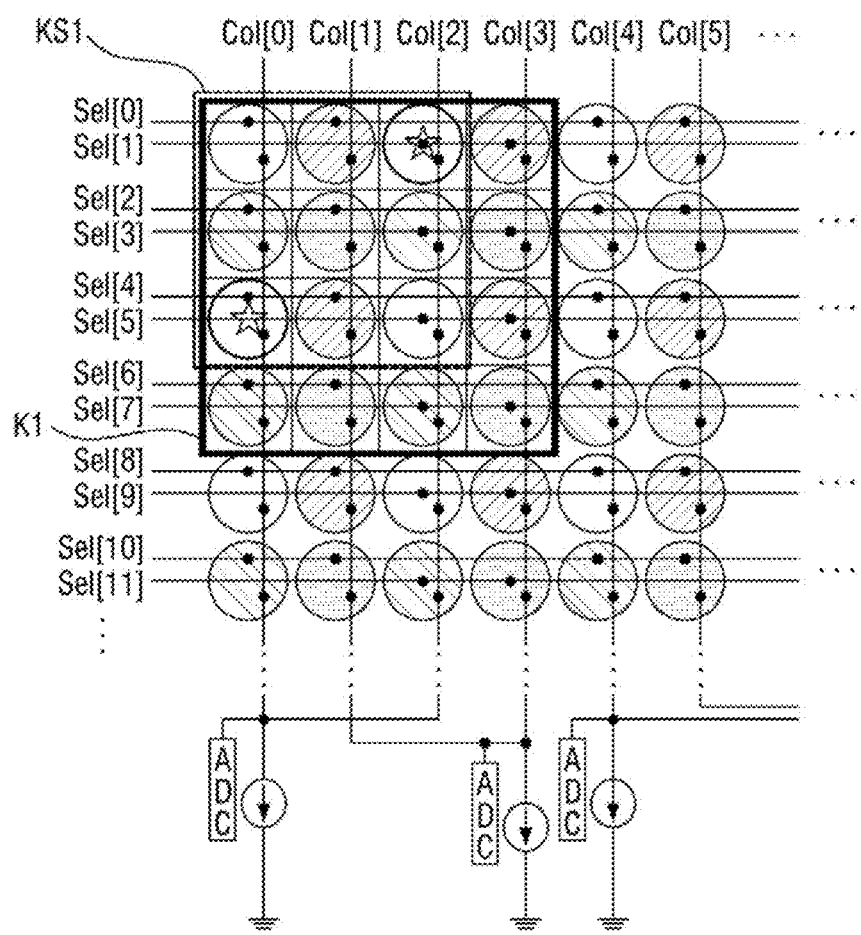
FIGS. 13 and 14 illustrate the image sensor of FIG. 11 for explaining an image binning method according to example embodiments.
Figure 14:
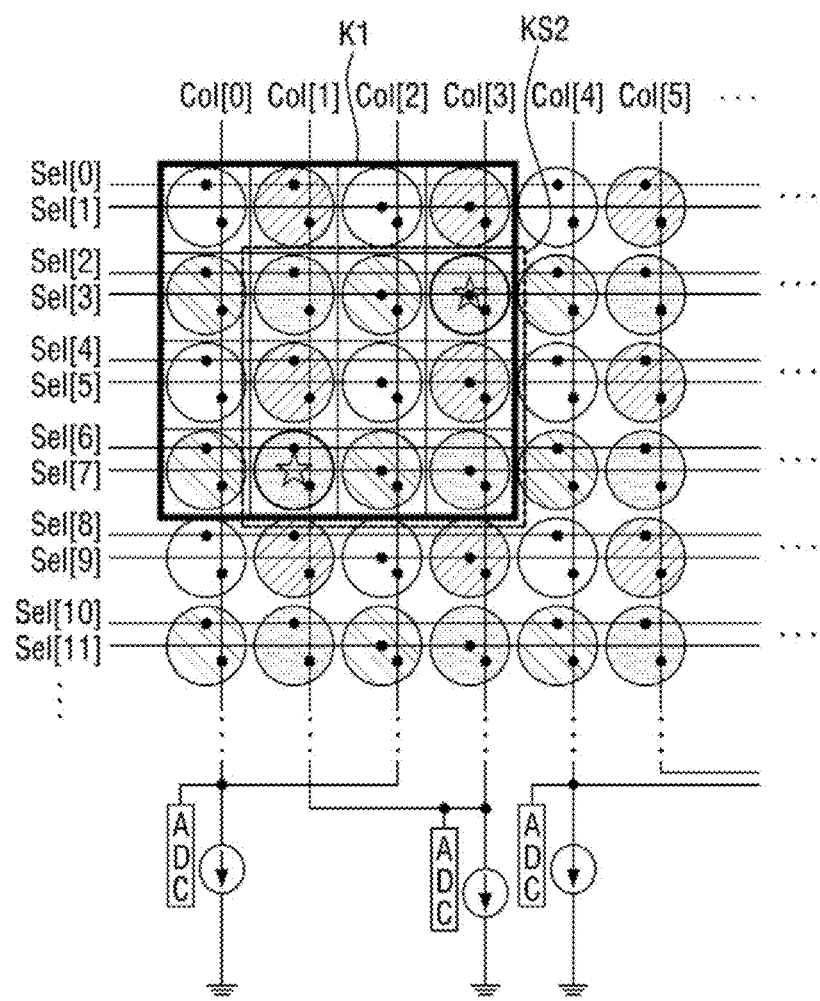

FIG. 11 illustrates an image sensor according to example embodiments. FIG. 12 is a circuit diagram of a pixel array of FIG. 11. FIGS. 13 and 14 illustrate the image sensor of FIG. 11 for explaining an image binning method according to example embodiments.

In some embodiments, an analog end may perform the image binning method described above with reference to FIGS. 8 and 9A to 9C. The analog end may include an ADC 240 and a current source.

The analog end may be connected in common to at least two columns that pixels of the same column belong to. For example, the analog end may be connected to at least two adjacent even-numbered or odd-numbered columns of a pixel array. Referring to FIG. 11, the ADC 240 may be connected between two adjacent even-numbered columns of a pixel array, and the analog end may perform a first binning process in a first diagonal direction. The ADC 240 may be connected between two adjacent odd-numbered columns of the pixel array, and the analog end may perform the first binning process in the first diagonal direction.

Referring to FIG. 11, the pixel array may include a plurality of unit kernels with 16 pixels, for example, a plurality of 4×4 unit kernels. The pixel array is driven in units of unit kernels. FIG. 12 illustrates an example in which each pixel includes a photodiode, a transfer transistor, a reset transistor, a selection transistor, and a drive transistor. A row-direction selection signal Sel is applied to the gate of the selection transistor, and a column-direction direction Col is applied to the drain of the selection transistor.

As illustrated in FIG. 12, each pixel may include four transistors and at least one photodiode, each pixel may include three transistors and at least one photodiode, or each pixel may include five transistors and at least one photodiode.

Referring to FIGS. 11, 12, and 13, Gr-pixel binning is performed on a sub-unit kernel KS1 of a unit kernel K1. Specifically, two Gr pixels in the first diagonal direction, marked by the symbol ☆ in FIG. 13, are received by turning on Sel[1], Sel[5], Col[0], and Col[2] in the unit kernel K1, and a Gr pixel at Sel[0] and Col[0] is received by turning on Sel[0] and Col[0]. The ADC 240 is connected in common to Col[0] and Col[2], and the analog end performs a first binning process on the two Gr pixels in the first diagonal direction, marked by the symbol ☆ in FIG. 13, and thereby outputs a median Gr value. The center of gravity of the median Gr value may be located at Sel[2] and Col[1]. An ISP 100 performs a second binning process on the value of the Gr pixel at Sel[0] and Col[0] and the median Gr value at Sel[2] and Col[1] and thereby outputs a binned Gr' pixel.

Referring to FIGS. 11, 12, and 14, Gb-pixel binning is performed on a sub-unit kernel KS2 of the unit kernel K1. Specifically, two Gb pixels in the first diagonal direction, marked by the symbol ☆ of FIG. 14, are received by turning on Sel[3], Sel[6], Col[1], and Col[3] in the sub-unit kernel KS2, and a Gb pixel at Sel[7] and Col[3] is received by turning on Sel[7] and Col[3]. The ADC 240 is connected in common to Col[1] and Col[3], and the analog end performs the first binning process on the two Gb pixels in the first diagonal direction, marked by the symbol ☆ of FIG. 14, and thereby outputs a median Gb value. The center of gravity of the median Gb value may be located at Sel[5] and Col[2]. The ISP 100 performs a second binning process on the value of the Gb pixel at Sel[7] and Col[3] and the median Gb value at Sel[5] and Col[2] and thereby outputs a binned Gb' pixel. In this manner, binned R' and B' pixels may also be output from a raw image.

Referring to FIG. 11, B-pixel binning is performed. Specifically, two B pixels in the first diagonal direction are received by turning on Sel[2], Sel[7], Col[0], and Col[2] in the pixel array, and a B pixel at Sel[6] and Col[0] is received by turning on Sel[6] and Col[0]. The ADC 240 is connected in common to Col[0] and Col[2], and the analog end performs a first binning process on the two B pixels in the first diagonal direction and thereby outputs a median B value. The ISP 100 performs a second binning process on the value of the B pixel at Sel[6] and Col[0] and the median B value and thereby outputs a binned B' pixel.

Referring to FIG. 11, R-pixel binning is performed. Specifically, two R pixels in the first diagonal direction, marked by the symbol in FIG. 14, are received by turning on Sel[4], Col[1], and Col[3] in the pixel array, and an R pixel at Sel[0] and Col[3] is received by turning on Sel[0] and Col[3]. The ADC 240 is connected in common to Col[0] and Col[2], and the analog end performs a first binning process on the two R pixels in the first diagonal direction and thereby outputs a median R value. The ISP 100 performs a second binning process on the value of the R pixel at Sel[0] and Col[3] and the median R value and thereby outputs a binned R' pixel.

Figure 15:
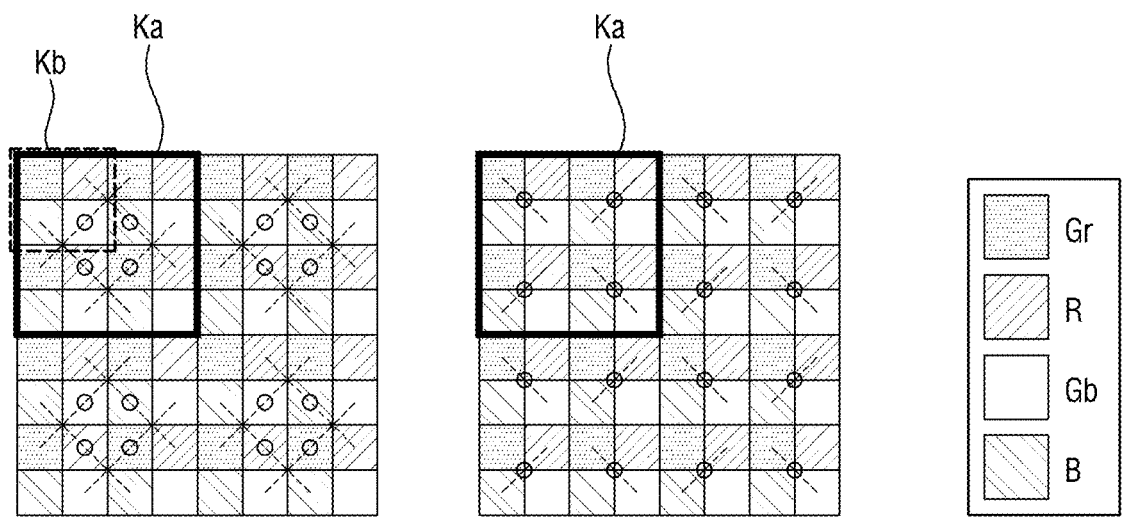
FIGS. 15 and 16 illustrate Bayer images for explaining an image binning method according to example embodiments.
Figure 16:
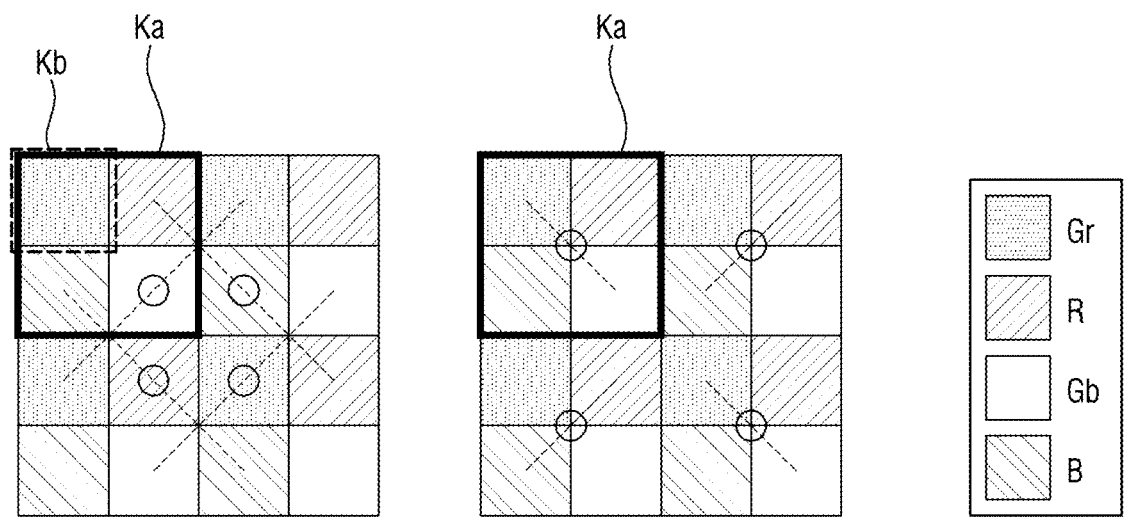

FIGS. 15 and 16 illustrate Bayer images for explaining an image binning method according to some embodiments of the present disclosure.

The image sensing apparatus 1 may perform 2N×2N binning on a raw image. That is, image binning may be performed by repeating 2×2 binning N times. FIGS. 15 and 16 illustrate that 4×4 binning is performed by performing 2×2 binning twice.

Referring to FIG. 15, a primary 2×2 binning process may be performed in units of kernels Ka. Specifically, a raw image may include a plurality of kernels Ka. The image sensing apparatus 1 may perform a primary 2×2 binning process on each of the plurality of kernels Ka.

In a primary 2×2 binning process, median values are arranged at locations marked by the symbol ○ in the left side kernels of FIG. 15 by performing diagonal binning, and binned pixels are arranged at locations marked by the symbol ○ in the right side kernels in FIG. 15 by performing corner binning. The binned pixels may be located at the centers of gravity of kernels Kb. Thus, as the primary 2×2 binning process is performed on Gr, R, B, and Gb pixels of each kernel Ka, Gr', R', B', and Gb' pixels obtained by the primary 2×2 binning process may be arranged in their entire respective kernels Kb of a corresponding kernel Ka, as illustrated in the left side kernels in FIG. 16.

Referring to FIG. 16, a secondary 2×2 binning process may be performed on a binned image obtained by the primary 2×2 binning process in units of 2×2 arrays of kernels Ka.

In a secondary 2×2 binning process, median values are arranged at locations marked by the symbol ○ in the left side kernels in FIG. 16 by performing diagonal binning, and binned pixels are arranged at locations marked by the symbol ○ in the right side kernels in FIG. 16 by performing corner binning on the median values. Binned pixels obtained by the secondary binning process may be arranged at the centers of gravity of the kernels Ka. Thus, as the secondary 2×2 binning process is performed on the Gr', R', B', and Gb' pixels, Gr, R, B, and Gb pixels obtained by the secondary 2×2 binning process are arranged in their entire respective kernels Ka.

Even if 4×4 binning is performed by performing 2×2 binning twice, binned pixels can still be uniformly arranged at the centers of gravity of kernels. Accordingly, false color defects or zagging noise can be effectively reduced.

The example embodiment of FIGS. 15 and 16 is exemplary for explaining 4×4 binning, but embodiments are not limited thereto. For example, according to an example embodiment 2N×2N binning may be performed by performing 2×2 binning N times, where N is a natural number.

Figure 17:
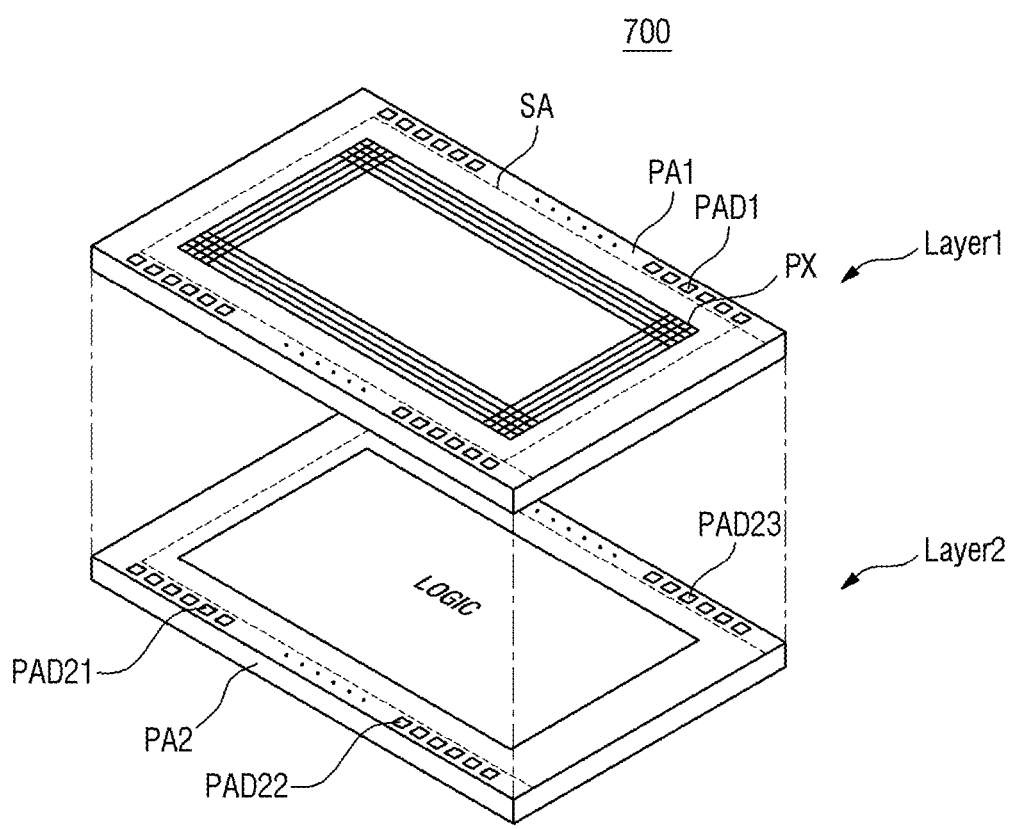
FIG. 17 is a perspective view of the image sensing apparatus of FIG. 1.

FIG. 17 is a perspective view of the image sensing apparatus of FIG. 1.

Referring to FIG. 17, the image sensor 700 may be implemented as a stack of a plurality of layers. The pixel array 210 may be implemented on a first layer 1, and the rest of the image sensor 200, such as a logic circuit LOGIC may be implemented on a second layer 2. The logic circuit LOGIC may include all the elements of the image sensor 200, except for the pixel array 210. For example, a pixel array region and a logic circuit region may be stacked on a wafer level.

The first layer 1 may include a sensing area SA, which includes a plurality of pixels PX, and a first pad area PA1, which is provided on the periphery of the sensing area SA. A plurality of upper pads PAD1 may be included in the first pad area PA1 and may be connected to the logic circuit LOGIC and pads PAD21 and pads PAD22 in a second pad area PA2 of the second layer 2 through vias.

In example embodiments, the pads PAD21 and the pads PAD22 may be input I/F pads, and pads PAD23 may be output I/F pads.

Figure 18:
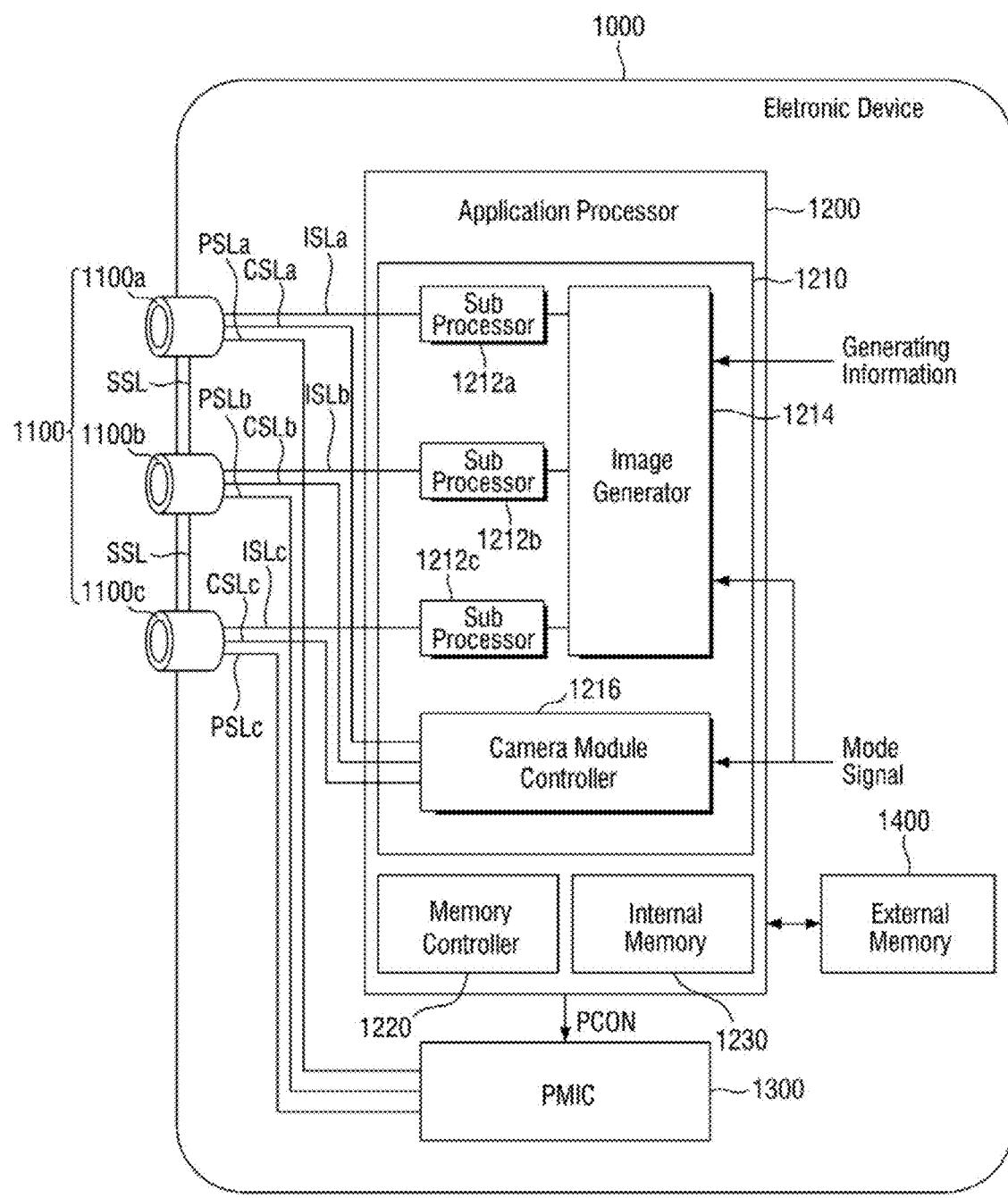
FIG. 18 is a block diagram of an electronic device including a multi-camera module according to example embodiments.
Figure 19:
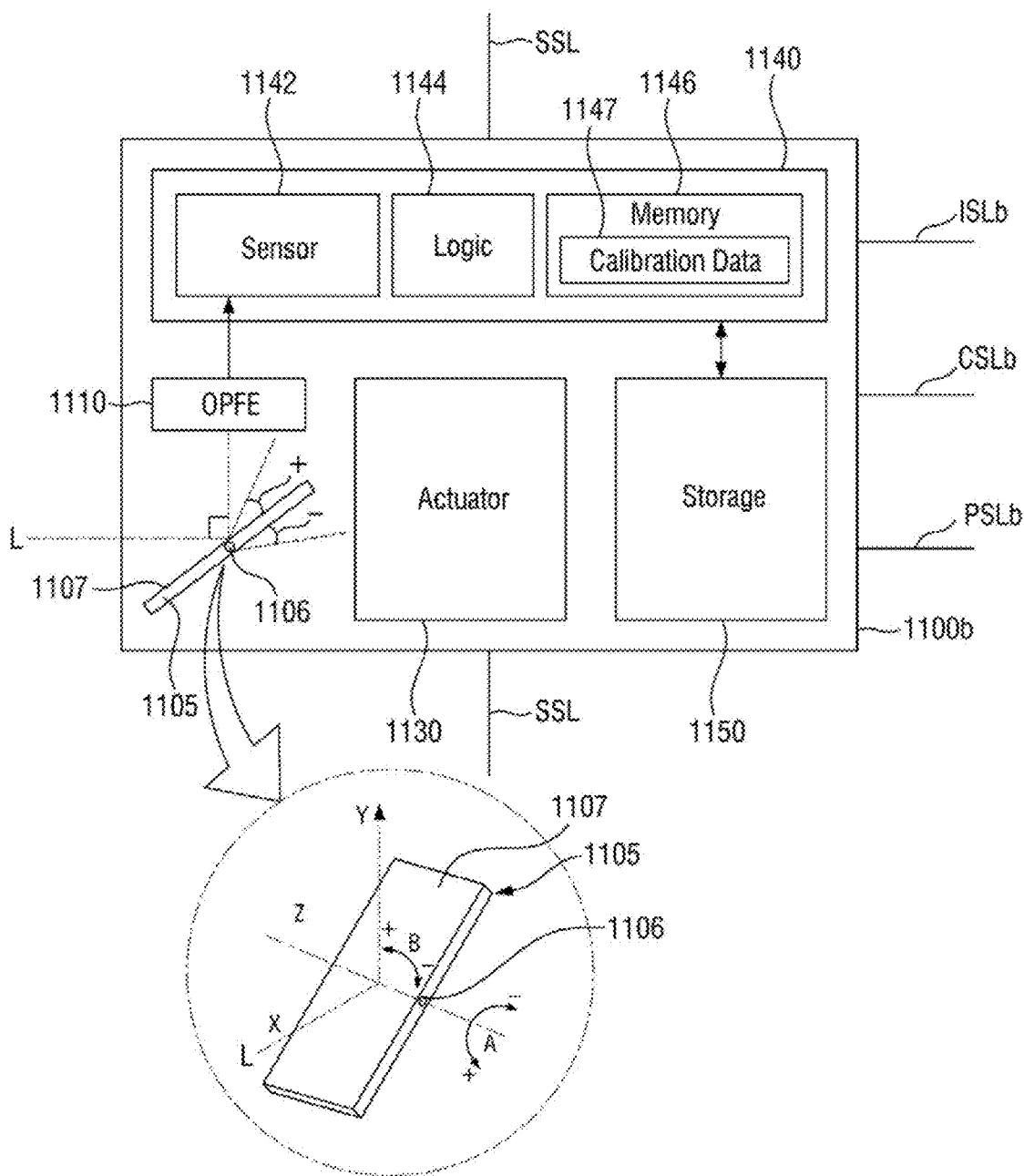
FIG. 19 is a detailed block diagram of the multi-camera module of FIG. 18.

FIG. 18 is a block diagram of an electronic device including a multi-camera module according to example embodiments. FIG. 19 is a detailed block diagram of the multi-camera module of FIG. 18.

Referring to FIG. 18, an electronic device 1000 may include a camera module group 1100, e.g., a camera assembly group, an application processor 1200, a power management integrated circuit (PMIC) 1300, and an external memory 1400.

The camera module group 1100 may include a plurality of camera modules 1100a, 1100b, and 1100c, e.g. a plurality of camera assemblies. FIG. 18 illustrates that the camera module group 1100 includes three camera modules, but embodiments are not limited thereto. For example, the camera module group 1100 may include two camera modules, or the camera module group 1100 may include n camera modules, where n is a natural number of 4 or greater.

The structure of the camera module 1100b will hereinafter be described with reference to FIG. 19. The description that follows may be directly applicable to the other camera modules of the camera module group 1100, for example, the camera modules 1100a and 1100c.

Referring to FIG. 19, the camera module 1100b may include a prism 1105, an optical path folding element (OPFE) 1110, an actuator 1130, an image sensing apparatus 1140, and a storage unit 1150.

The prism 1105 may include a reflective surface 1107 of a light-reflecting material and may thus change the path of light L incident from the outside.

In example embodiments, the prism 1105 may change the path of light L incident in a first direction X to a second direction Y, which is perpendicular to the first direction X. Also, the prism 1105 may change the path of the light L incident in the first direction X to the second direction Y by rotating the light L in an A or B direction from a central axis 1106 of the reflective surface 1107. In this case, the OPFE 1110 may move in a third direction Z, which is perpendicular to the first direction X and the second direction Y.

In example embodiments, the maximum rotation angle of the prism 1105 may be 15 degrees or less in a plus A direction and 15 degrees of greater in a minus A direction, but embodiments are not limited thereto.

In example embodiments, the prism 1105 may move at an angle of about 20°, about 10° to 20°, or about 15° to about 20° in a plus B or minus B direction. The angle by which the prism 1105 moves may be the same in both the plus B direction and the minus B direction or may be almost similar with a difference of about 1°.

In example embodiments, the prism 1105 may move in the third direction Z, which is parallel to the direction in which the central axis 1106 of the reflective surface 1107 extends.

The OPFE 1110 may include, for example, a group of m optical lenses, where m is a natural number. The m optical lenses may be moved in the second direction Y to change the optical zoom ratio of the camera module 1100b. For example, if the default optical zoom ratio of the camera module 1100b is Z, the optical zoom ratio of the camera module 1100b may be changed to 3Z or 5Z or greater by moving the m optical lenses of the OPFE 1110.

The actuator 1130 may move the OPFE 1110 or an optical lens to a particular location. For example, the actuator 1130 may adjust the location of the optical lens such that an image sensor 1142 may be located at the focal length of the optical lens for a precise sensing.

The image sensing apparatus 1140 may include the image sensor 1142, a control logic 1144, and a memory 1146. The image sensor 1142 may sense an image of a target object using the light L provided thereto via the optical lens. The control logic 1144 may control the general operation of the camera module 1100b. For example, the control logic 1144 may control the operation of the camera module 1100b in accordance with control signals provided via a control signal line CSLb.

The memory 1146 may store information necessary for the operation of the camera module 1100b, such as calibration data 1147. The calibration data 1147 may include information necessary for generating image data using the light L. The calibration data 1147 may include, for example, degree-of-rotation information, focal length information, and optical axis information. In a case where the camera module 1100b is implemented as a multi-state camera whose focal distance changes in accordance with the location of the optical lens, the calibration data 1147 may include focal distances for different locations or different states of the optical lens and autofocusing information.

The storage unit 1150 may store image data sensed by the image sensor 1142. The storage unit 1150 may be disposed on the outside of the image sensing apparatus 1140 and may be implemented as being stacked on a sensor chip that forms the image sensing apparatus 1140. In example embodiments, the storage unit 1150 may be implemented as an electrically erasable programmable read-only memory (EEPROM), but embodiments are not limited thereto.

Referring to FIGS. 18 and 19, in example embodiments, the camera modules 1100a, 1100b, and 1100c may include actuators 1130. The camera modules 1100a, 1100b, and 1100c may include the same calibration data 1147 or different calibration data 1147 depending on the operation of the actuators 1130.

In example embodiments, one of the camera modules 1100a, 1100b, and 1100c, for example, the camera module 1100b, may be a folded lens-type camera module including the prism 1105 and the OPFE 1110, and the other camera modules, for example, the camera modules 1100a and 1100c, may be vertical camera modules not including the prism 1105 and the OPFE 1110. However, embodiments are not limited to this.

In example embodiments, the camera module 1100c may be, for example, a depth camera capable of extracting depth information using infrared (IR) light. In this case, the application processor 1200 may generate a three-dimensional (3D) depth image by merging image data provided by the camera module 1100c and image data provided by the other camera modules, for example, the camera modules 1100a and 1100b.

In example embodiments, at least two of the camera modules 1100a, 1100b, and 1100c may have different fields of view. In this case, at least two of the camera modules 1100a, 1100b, and 1100c, for example, the camera modules 1100a and 1100b, may have different optical lenses, but embodiments are not limited thereto.

In example embodiments, the camera modules 1100a, 1100b, and 1100c may have different fields of view. In this case, the camera modules 1100a, 1100b, and 1100c may have different optical lenses, but embodiments are not limited thereto.

In example embodiments, the camera modules 1100a, 1100b, and 1100c may be disposed to be physically separate from one another. For example, the camera modules 1100a, 1100b, and 1100c may not share the sensing area of a single image sensor 1142 together, but independent image sensors 1142 may be disposed in the camera modules 1100a, 1100b, and 1100c.

Referring again to FIG. 18, the application processor 1200 may include an image processor 1210, a memory controller 1220, and an internal memory 1230. The application processor 1200 may be implemented as being separate from the camera modules 1100a, 1100b, and 1100c. For example, the application processor 1200 and the camera modules 1100a, 1100b, and 1100c may be implemented as separate semiconductor chips.

The image processor 1210 may include a plurality of sub-image processors 1212a, 1212b, and 1212c, an image generator 1214, and a camera module controller 1216.

The image processor 1210 may include a number of sub-image processors corresponding to a number of camera modules, for example, a plurality of sub-image processors 1212a, 1212b, and 1212c corresponding to the camera modules 1100a, 1100b, and 1100c, respectively.

Image data generated by the camera modules 1100a, 1100b, and 1100c may be provided to the sub-image processors 1212a, 1212b, and 1212c via image signal lines ISLa, ISLb, and ISLb, which are separate from one another. For example, the image data generated by the camera module 1100a may be provided to the sub-image processor 1212a via the image signal line ISLa, the image data generated by the camera module 1100b may be provided to the sub-image processor 1212b via the image signal line ISLb, and the image data generated by the camera module 1100c may be provided to the sub-image processor 1212c via the image signal line ISLc. The transmission of the image data may be performed via, for example, a mobile industry processor interface (MIPI)-based camera serial interface (CIS), but embodiments are not limited thereto.

In example embodiments, a single sub-image processor may be disposed to correspond to a plurality of camera modules. For example, the sub-image processors 1212a and 1212c may be incorporated into a single integrated sub-image processor, and the image data provided by the camera module 1100a or the image data provided by the camera module 1100c may be selected by a selection element (e.g., a multiplexer) and may then be provided to the integrated sub-image processor.

The image data provided to each of the sub-image processors 1212a, 1212b, and 1212c may be provided to the image generator 1214. The image generator 1214 may generate an output image using the image data provided thereto from each of the sub-image processors 1212a, 1212b, and 1212c, in accordance with image generating information or a mode signal.

For example, the image generator 1214 may generate an output image by merging at least some of the image data provided by the camera modules 1100a, 1100b, and 1100c, which have different fields of view, in accordance with the image generating information or the mode signal. Also, the image generator 1214 may generate an output image by selecting one of the image data generated by the camera modules 1100a, 1100b, and 1100c, which have different fields of view, in accordance with the image generating information or the mode signal.

In example embodiments, the image generating information may include a zoom signal or a zoom factor. In example embodiments, the mode signal may be, for example, a signal based on a mode selected by a user.

In a case where the image generating information is a zoom signal or a zoom factor and the camera modules 1100a, 1100b, and 1100c have different fields of view, the image generator 1214 may perform different operations depending on the type of zoom signal. For example, when the zoom signal is a first signal, the image data provided by the camera module 1100a and the image data provided by the camera module 1100c may be merged together, and an output image may be generated using the merged image data and the image data provided by the camera module 1100b. When the zoom signal is a second signal, which is different from the first signal, one of the image data provided by the camera module 1100a, the image data provided by the camera module 1100b, and the image data provided by the camera module 1100c may be chosen, and an output image may be generated using the chosen image data. However, embodiments not limited to this example. The method to process image data may vary, as necessary.

In example embodiments, the image generator 1214 may receive a plurality of image data having different exposure times from at least one of the sub-image processors 1212a, 1212b, and 1212c and may perform high-dynamic range processing on the plurality of image data, thereby generating merged image data with an enhanced dynamic range.

The camera module group 1100 may include the image sensing apparatus 200 of FIG. 1.

The ISP 100 of FIG. 1 may be implemented inside the camera module group 1100 of FIG. 19, in the sub-image processors 1212a, 1212b, and 1212c of FIG. 18, or in the image generator 1214 of FIG. 18.

The camera module controller 1216 may provide control signals to the camera modules 1100a, 1100b, and 1100c. The control signals provided by the camera module controller 1216 may be provided to the camera modules 1100a, 1100b, and 1100c via the control signal lines CSLa, CSLb, and CSLc, which are separate from one another.

One of the camera modules 1100a, 1100b, and 1100c, for example, the camera module 1100b, may be designated as a master camera in accordance with the mode signal or the image generating information, which includes a zoom signal, and the other camera modules, i.e., the camera modules 1100a and 1100c, may be designated as slave cameras. This type of information may be included in a control signal and may then be provided to the camera modules 1100a, 1100b, and 1100c via the control signal lines CSLa, CSLb, and CSLc, which are separate from one another.

Master and slave camera modules may be changed in accordance with a zoom factor or the mode signal. For example, when the camera module 1100a has a wider field of view, but a zoom ratio with a smaller zoom factor, than the camera module 1100b, the camera module 1100b may operate as a master, and the camera module 1100a may operate as a slave. When the camera module 1100a has a zoom ratio with a greater zoom factor than the camera module 1100b, the camera module 1100a may operate as a master, and the camera module 1100b may operate as a slave.

In example embodiments, the control signals provided from the camera module controller 1216 to the camera modules 1100a, 1100b, and 1100c may include a sync enable signal. For example, if the camera module 1100b is a master camera and the camera modules 1100a and 1100c are slave cameras, the camera module controller 1216 may transmit the sync enable signal to the camera module 1100b. The camera module 1100b may receive the sync enable signal, may generate a sync signal based on the sync enable signal, and may provide the sync signal to the camera modules 1100a and 1100c via sync signal lines SSL. The camera modules 1100a, 1100b, and 1100c may transmit image data to the application processor 1200 in synchronization with the sync signal.

In example embodiments, the control signals provided from the camera module controller 1216 to the camera modules 1100a, 1100b, and 1100c may include mode information corresponding to the mode signal provided to the camera modules 1100a, 1100b, and 1100c. The camera modules 1100a, 1100b, and 1100c may operate in one of the first operation mode and the second operating mode, which are associated with the speed of sensing, in accordance with the mode information.

In the first operating mode, the camera modules 1100a, 1100b, and 1100c may generate an image signal at a first speed, for example, generate an image signal of a first frame rate, may encode the image signal at a second speed which is higher than the first speed, for example, encode the image signal at a second frame rate, which is higher than the first frame rate, and may transmit the encoded image signal to the application processor 1200. Here, the second speed may be less than 30 times the first speed.

The application processor 1200 may store a received image signal, for example, an encoded image signal, in the internal memory 1230 or in the external memory 1400, may read and decode the encoded image signal from the internal memory 1230 or the external memory 1400, and may display image data generated based on the decoded image signal. For example, the decoding of the encoded image signal may be performed by the sub-processors 1212a, 1212b, and 1212c of the image processing apparatus 1210, and image processing may be performed on the decoded image signal.

In the second operating mode, the camera modules 1100a, 1100b, and 1100c may generate an image signal at a third speed, which is lower than the first speed, for example, generate an image signal of a third frame rate, which is lower than the first frame rate, and may transmit the image signal to the application processor 1200. The image signal transmitted to the application processor 1200 may be a non-encoded signal. The application processor 1200 may perform image processing on the image signal received from the camera modules 1100a, 1100b, and 1100c or may store the received image signal in the internal memory 1230 or the external memory 1400.

The PMIC 1300 may supply power, for example, a power supply voltage, to the camera modules 1100a, 1100b, and 1100c. For example, the PMIC 1300 may supply first power to the camera module 1100a via a power signal line PSLa, second power to the camera module 1100b via a power signal line PSLb, and third power to the camera module 1100c via a power signal line PSLc, under the control of the application processor 1200.

The PMIC 1300 may generate power corresponding to each of the camera modules 1100a, 1100b, and 1100c and control the level of the power in response to a power control signal PCON from the application processor 1200. The power control signal PCON may include power control signals for different operating modes of the camera modules 1100a, 1100b, and 1100c. For example, the operating modes of the camera modules 1100a, 1100b, and 1100c may include a low power mode, in which case, the power control signal PCON may include information indicating which camera module is to operate in the low power mode and information indicating the level of power to be set. The level of power provided may be the same for all the camera modules 1100a, 1100b, and 1100c or may differ from one camera module to another camera module. Also, the level of power provided may be dynamically changed.

While the present disclosure has been shown and described with reference to various example embodiments thereof, it will be understood by those skilled in the art that various changes in form and details may be made therein without departing from the spirit and scope as defined by the appended claims and their equivalents.

What is claimed is:

1. An image sensing apparatus comprising:
    an image sensor comprising:
        a pixel array configured to output a raw image having a Bayer pattern; and
        an analog end configured to perform an analog binning process on groups of pixels of same colors included in same columns of each of a plurality of sub-kernels corresponding to a first green pixel, a red pixel, a blue pixel, and a second green pixel, and output median values for different colors; and
    a digital signal processor configured to perform a digital binning process on the median values for the same colors included in different columns of each of the plurality of sub-kernels, and output a binned image,
    wherein the analog binning process and the digital binning process are performed on the raw image in units of unit kernels, each unit kernel including the plurality of sub-kernels, and
    wherein the plurality of sub-kernels are arranged such that sub-kernels included in a same column are in an asymmetrical arrangement with each other and do not overlap with each other in a vertical direction.

2. The image sensing apparatus of claim 1, wherein a sum of a length of a first sub-kernel in a first direction and a length of a second sub-kernel in the first direction is equal to a length of a unit kernel in the first direction, and
    wherein the length of the first sub-kernel and the length of the second sub-kernel are closest odd numbers.

3. The image sensing apparatus of claim 1, wherein the analog end comprises:
    an analog-to-digital converter connected to a plurality of columns of the pixel array; and
    a buffer connected to the analog-to-digital converter and configured to store the median values, and
    wherein the analog-to-digital converter is configured to digitalize a sum of values received from at least two pixels of a same color included in a same column and output a result of the digitalization as one of the median values.

4. The image sensing apparatus of claim 1, wherein the digital binning process further comprises summing median values included in different columns of a sub-kernel corresponding to a predetermined color, dividing the summed result by a number of pixels of the predetermined color included in the sub-kernel corresponding to the predetermined color, and outputting the divided result as a pixel value of the binned image for the predetermined color.

5. The image sensing apparatus of claim 4, wherein a center of gravity of a pixel for the predetermined color coincides with a center of gravity of the sub-kernel corresponding to the predetermined color.

6. An image binning method of an image sensing apparatus, the image binning method comprising:
    receiving a raw image of a Bayer pattern from a pixel array;
    outputting median values for each kernel based on performing an analog binning process on the raw image of a unit kernel having an asymmetrical arrangement with respect to different colors; and
    outputting a binned image based on performing a digital binning process on at least one of the median values,
    wherein the raw image comprises a plurality of unit kernels respectively comprising:
        a first green sub-kernel and a red sub-kernel that are provided adjacent to each other in a row direction, and
        a blue sub-kernel and a second green sub-kernel that are provided adjacent to the first green sub-kernel and the red sub-kernel in a column direction and are provided adjacent to each other in the row direction,
    wherein a sum of a length of a first sub-kernel in the column direction or the row direction and a length of a second sub-kernel in the column direction or the row direction is same as a length of the unit kernel in the column direction or the row direction, the first sub-kernel and the second sub-kernel being adjacent to each other in the column direction or the row direction, and
    wherein the first sub-kernel and the second sub-kernel do not overlap with each other in the column direction or the row direction.

7. The image binning method of claim 6, wherein the raw image comprises a plurality of unit kernels,
    wherein
        the first green sub-kernel and the red sub-kernel have different lengths in the row direction, and
    wherein the blue sub-kernel and the second green sub-kernel have different lengths in the row direction, wherein the first green sub-kernel and the blue sub-kernel have different lengths in the column direction, and wherein the red sub-kernel and the second green sub-kernel have different lengths in the column direction.

8. The image binning method of claim 7, wherein the length of the first sub-kernel and the length of the second sub-kernel are closest odd numbers.

9. The image binning method of claim 7, wherein the analog binning process further comprises summing pixel values received from at least two first-color pixels included in a same column in a first sub-kernel corresponding to a first color among a plurality of sub-kernels and outputting first median values, and the digital binning process further comprises summing first median values included in different columns of the first sub-kernel, dividing the summed result by a number of first-color pixels included in the first sub-kernel, and outputting the divided result as a pixel value of the binned image for the first color.

10. An image sensing apparatus comprising:

an image sensor comprising:

a pixel array configured to output a raw image of a Bayer pattern, and an analog end configured to perform an analog binning process on a first pixel and a second pixel provided in a diagonal direction for each color from each of square unit kernels of the raw image and output a median value for a corresponding color; and a digital signal processor configured to obtain and output a binned pixel value based on performing a digital binning process on the median value and a third pixel that is provided at a corner of the corresponding color from each of the unit kernels and generate a binned image including the binned pixel value.

11. The image sensing apparatus of claim 10, wherein the analog end comprises:

a plurality of analog-to-digital converters shared by two adjacent odd-numbered columns and two adjacent even-numbered columns in the pixel array, and a buffer connected to the plurality of analog-to-digital converters and configured to store the median value.

12. The image sensing apparatus of claim 10, wherein each of the plurality of unit kernels have a length of (4n+4) pixels in a column direction and a row direction, where n is a natural number.

13. The image sensing apparatus of claim 10, wherein a center of gravity of a binned pixel is provided at a center of gravity between the first pixel, the second pixel, and the third pixel.

14. The image sensing apparatus of claim 10, wherein the binned image is an image obtained by performing both of the analog binning process and the digital binning process at least once.

* * * * *